United States Patent [19]

Ingard et al.

[11] 4,346,781
[45] Aug. 31, 1982

[54] LINED-DUCT ACOUSTIC FILTER

[75] Inventors: Karl U. Ingard, South Lincoln, Mass.; William P. Patrick, Glastonbury, Conn.

[73] Assignee: Massachusetts Institute of Technology, Cambridge, Mass.

[21] Appl. No.: 157,530

[22] Filed: Jun. 9, 1980

Related U.S. Application Data

[63] Continuation of Ser. No. 961,113, Nov. 16, 1978, abandoned, which is a continuation of Ser. No. 738,422, Nov. 3, 1976, abandoned.

[51] Int. Cl.$^3$ .......................... F01N 1/06; F01N 1/10; F01N 1/24; E04F 17/04
[52] U.S. Cl. .................................... 181/206; 181/224; 181/252; 181/257
[58] Field of Search ............... 181/206, 213, 218, 222, 181/224, 249, 250, 253, 256, 257, 282, 286

[56] References Cited

U.S. PATENT DOCUMENTS

| | | | |
|---|---|---|---|
| 3,113,635 | 12/1963 | Allen et al. | 181/252 |
| 3,174,583 | 3/1965 | Giordano | 181/252 |
| 3,568,791 | 3/1971 | Luxton | 181/224 |
| 3,580,357 | 5/1971 | Whitney | 181/253 |
| 3,830,335 | 8/1974 | Zorumski | 181/206 |
| 3,948,349 | 4/1976 | Bychinsky | 181/206 |

*Primary Examiner*—L. T. Hix
*Assistant Examiner*—Thomas H. Tarcza
*Attorney, Agent, or Firm*—Arthur A. Smith, Jr.; Martin M. Santa

[57] ABSTRACT

A lined duct is divided into two parallel branches by means of a rigid partition. The phase speed of the fundamental mode in each branch depends on the liner configuration and can differ markedly from the free-space phase speed. When the liners in the two branches are not the same, the corresponding phase speeds will be different and a relative phase lag between the waves in the two branches results. This, in turn, leads to interference between these wave components (and their reflections) both at the exit and entrance of the parallel branch pair. This interference can be exploited for the purpose of obtaining a low-frequency attenuation which is substantially larger than the attenuation of the unpartitioned duct.

8 Claims, 9 Drawing Figures

LINED-DUCT ACOUSTIC FILTER

BACKGROUND OF THE INVENTION

The Government has rights in this invention pursuant to Grant No. 0014-67-A-0204-0019 awarded by the U.S. Office of Naval Research and pursuant to Grant Agreement DOT-OS-3011 awarded by the U.S. Department of Transportation.

This is a continuation of application Ser. No. 961,113, filed Nov. 16, 1978 which was a continuation of pending prior application Ser. No. 738,422 filed Nov. 3, 1976 both now abandoned.

This invention relates to sound filters and in particular to a filter to be used in a duct for obtaining significant transmission loss at low frequencies, i.e., 25 Hz to 1000 Hz, both at discrete frequencies and broadband.

Former methods of low frequency sound attenuation in ducts were of two types. For broadband attenuation thick dissipative acoustic liners (e.g. acoustic foam, fiberglass, and other bulk materials) were placed on the duct wall. For attenuation of discrete low frequency sounds, resonator chambers of various shapes and sizes were used.

To achieve efficient attenuation of sound using these former methods, the thickness of the dissipative liner or the length of the resonator chamber were sized in direct proportion to the wavelength of sound to be attenuated. Thus, for low frequency sounds dissipative liners were necessarily very thick and the resonators became quite large. Not only were the sound attenuation systems costly, but often they were impractical because of the limited space available in ducts for their installation. In addition, side branch resonators can be excited by flow and produce rather than reduce noise.

The parallel duct configuration of this invention can be regarded as an improvement of the Herschel-Quincke tube, which was invented over 100 years ago. In the Herschel-Quincke tube a duct is branched into two parts of equal cross section but with different lengths. The duct walls are rigid, and the phase difference and the corresponding interference between the branch waves are obtained solely as a result of the difference in the branch lengths. However, for the purpose of noise control such an arrangement is difficult to implement in practice.

The problem of sound transmission in lined ducts has received considerable attention in recent years, with particular emphasis on the interrelationship between sound attenuation and the various parameters that specify the duct and the duct liner. The phase speed of a particular acoustic mode in the duct depends on the same parameters, but comparatively little attention has been paid to this dependence, since it has not been a principal concern in problems of sound attenuation.

In contrast, it is an object of this invention to provide a simple duct configuration in which the phase speed plays an essential role in regard to sound attenuation.

It is a further object of this invention to provide an acoustic filter having high transmission loss, while being compatible with duct space availability.

Features of this invention over previous methods of sound attenuation are: Thinner acoustic liners can be used to obtain a desired attenuation at low frequencies. For ducts having mean flow the fluid dynamic pressure drop induced by the parallel duct will be less than a resonator system having equal acoustic attenuation. The parallel duct configuration is readily tunable by either changing the length of the splitter plate, or moving the splitter plate laterally or longitudinally in the duct.

SUMMARY OF THE INVENTION

Low frequency sound attenuation in a lined duct is obtained by dividing it into two parallel ducts using a rigid splitter plate as shown in FIG. 1. Since the phase speed of the sound wave propagating in a lined duct is reduced at low frequencies in proportion to the ratio of the thickness of the liner to the width of the duct, a lined duct acts as a delay line for low frequency sound waves. By lining each parallel duct section with a different relative liner thickness or having a liner in only one duct section destructive interference can be effected between the out-of-phase transmitted waves. Higher order modes will be generated at the exit of the parallel duct asembly but will decay exponentially if the duct width is less than half the wavelength of sound. This condition is satisfied at low frequencies and only plane waves of reduced amplitude will propagate down the exit duct. Also, reflections from the entrance of the parallel duct are substantial at selected frequencies. The reflected and interfering frequencies can be made to occur at desired low frequencies by proper choice of splitter length and liner thickness.

THE FIGURES

Figure 1:
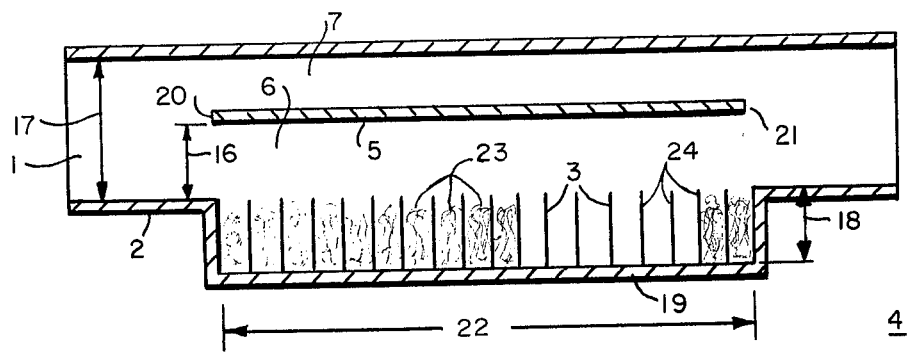
FIG. 1 shows one embodiment of the filter of this invention.
Figure 2:
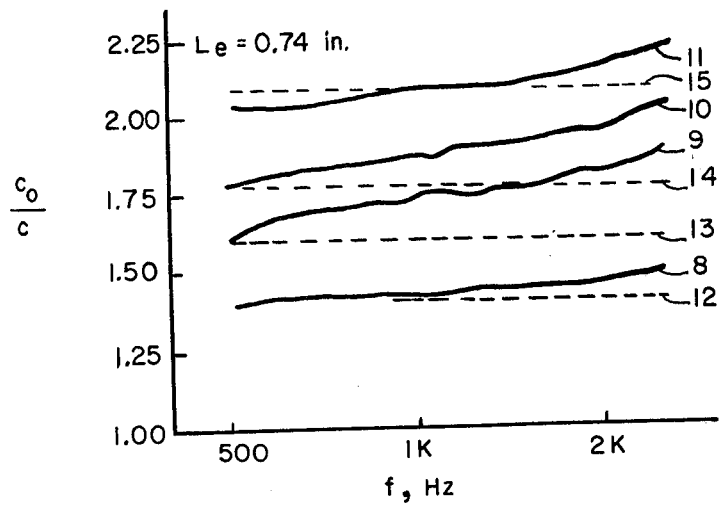
FIG. 2 is a plot of measured phase speeds of the fundamental mode in the lined channel of the embodiment of FIG. 1 for different divider spacings.
Figure 3A:
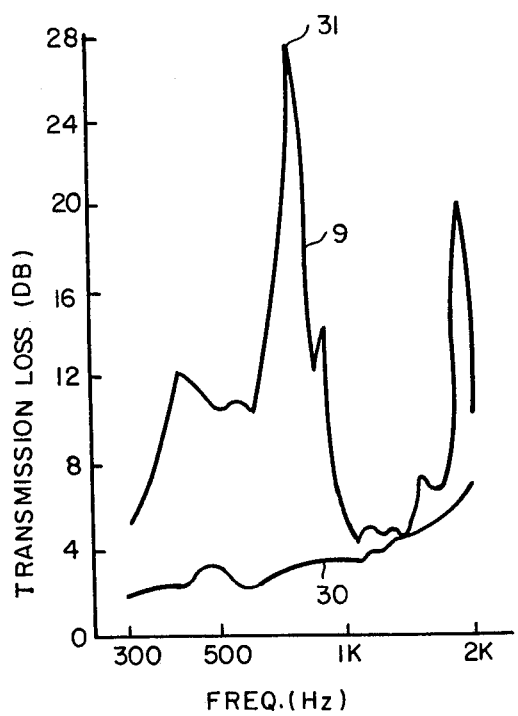
Figure 3B:
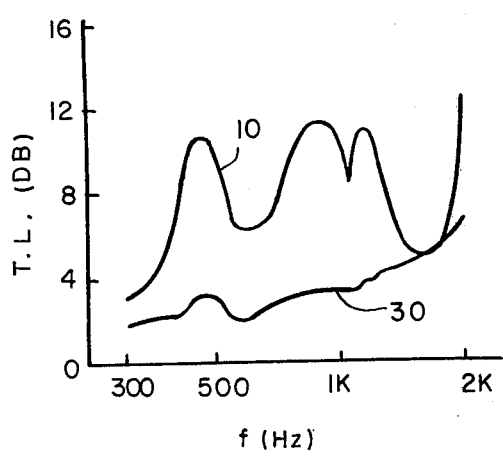
Figure 3C:
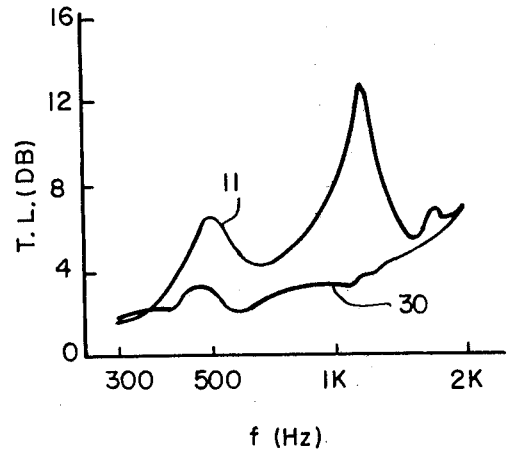

FIGS. 3(a), 3(b) and 3(c) show the measured transmission loss of the filter of FIG. 1 for the divider spacings of FIG. 2.

Figure 4:
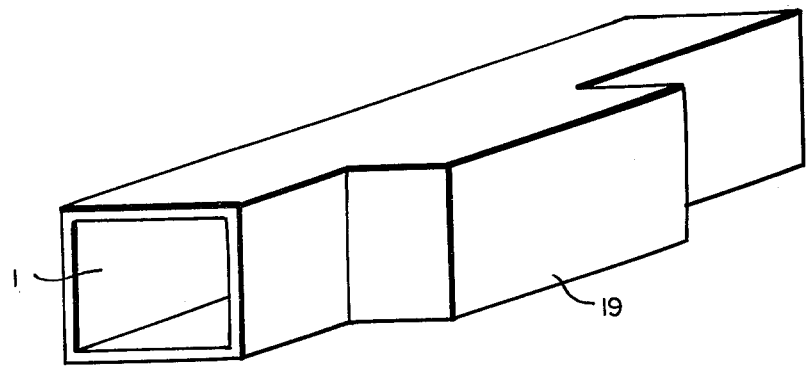

FIG. 4 shows a perspective view of the embodiment of FIG. 1.

Figure 5:
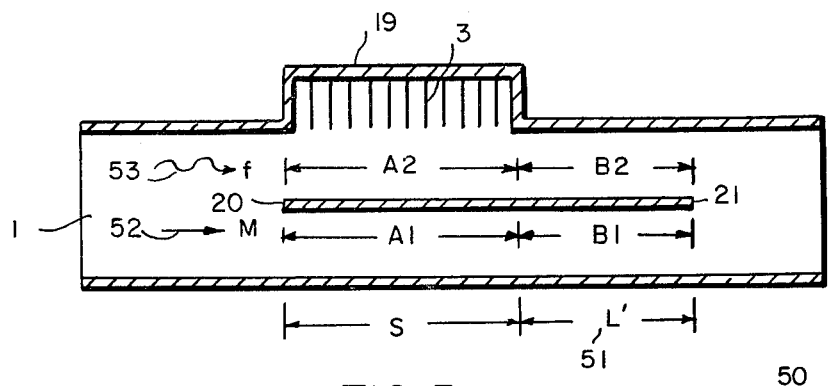

FIG. 5 is a cross-sectional view of another embodiment of a rectangular duct filter with an extended divider.

Figure 6A:
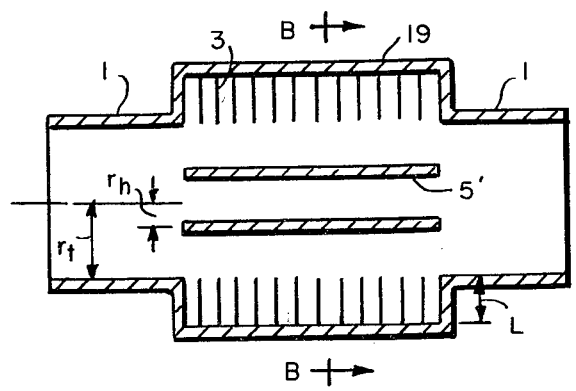
Figure 6B:
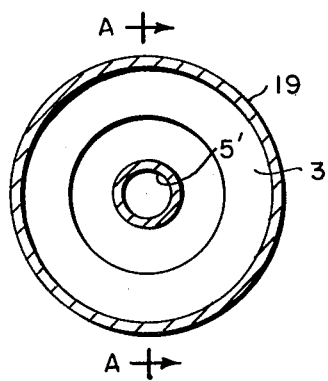

FIGS. 6(a) and 6(b) are cross-sectional views of a circular duct filter.

THE INVENTION

One preferred embodiment of the invention is shown in top cross-sectional view of FIG. 1. In this particular configuration an incident wave in the duct 1, which is called the main duct, is admitted into two parallel duct branches 6, 7 in which the phase speeds are different. The incident wave in the main duct produces a wave in each duct branch. The phase fronts of these branch waves will be displaced with respect to each other and generally will be reflected from the ends of each branch. The interference that takes place between the branch waves so displaced (including reflections) at the entrance and the exit of the parallel duct pair, 6, 7 can consequently provide an overall attenuation.

In this invention, the low frequencies to be attenuated have acoustic wavelengths considerably larger than the transverse dimensions of the main duct, so that only the plane wave component can propagate in this duct. When the wavelength is also much larger than the liner thickness, and the liner consist of a pervious porous material or a honeycomblike structure or other structure which has the properties of a point-reacting liner, the phase speed c of the fundamental mode in the duct is smaller than the free space speed $c_o$ and is given by $$c = c_o[1 + (L_e/b)]^{-1/2} \quad (1)$$

where $L_e$ is the effective liner thickness. $L_e$ is obtained from the product of the liner thickness 18 (L) and the void volume ratio of the liner which is defined as the ratio of the volume of the void space in the liner to the total volume of the liner, $\lambda$, and b is a quantity proportional to the effective width of the duct. For a rectangular duct lined on one side, b is simply the width 16 of the duct 6 between the liner 3 and the divider 5 opposite it.

If in a parallel duct filter one branch is lined and the other unlined, the difference in phase between the waves at the outlet of the two branches after n end reflections will be $$\Delta \phi_1 = \frac{2(n+1)S}{\lambda} \left[ \frac{c_o}{c} - 1 \right] \pi \quad (2)$$

where S is the length of the filter and $\lambda$ the wavelength. Destructive interference effects occur when $\Delta\phi_1$ is an odd integer of $\pi$.

At either termination of the parallel duct filter, the wave in each branch will not only be reflected within the branch, but will also induce a "reflected" wave in the adjacent branch. After m round trips in the parallel duct filter, the difference in phase between the induced wave and the wave incident upon the entrance of the parallel duct filter will be $$\Delta \phi_2 = \frac{2mS}{\lambda} \left[ \frac{c_o}{c} + 1 \right] \pi \quad (3)$$

When $\Delta\phi_2$ is an even multiple of $\pi$, strong reflections occur at the entrance to the parallel duct filter. In the low-frequency limit the value of $c_o/c$ is given by Eq. 1.

Phase Velocity Measurements

In order to demonstrate experimentally the basic idea of the parallel lined duct filter, the interference between waves which have been phase delayed by different amounts, a duct arrangement shown schematically in FIG. 1 was used. FIG. 1 shows a top cross-sectional view of a rectangular duct 1 with one wall 2 lined with a honeycomb type liner 3. The parallel duct filter 4 was obtained merely by inserting a rigid partition 5 in the duct 1 so as to divide it into two parallel branches, one lined 6 and one unlined 7.

The phase speed in the unlined duct branch 7 is the same as the free space speed $c_o$. The phase speed c in the lined duct branch 6 is smaller, as can be seen in FIG. 2, where $c_o/c$ is shown as a function of frequency for four duct configurations. Curve 8 shows the phase speed for the lined duct without the rigid partition in place. Curves 9, 10 and 11 were obtained for different lateral spacings 16 of the rigid partition 5 in the duct. The phase velocity was obtained by measuring the variation of phase of a traveling wave as a function of distance along the duct. The phase velocity was obtained by measuring the variation of phase of a traveling wave as a function of distance along the duct. The calculated low-frequency value of the phase speed for each lateral spacing 16 as given by Eq. 1 is also shown in FIG. 2 as dashed lines 12, 13, 14 and 15, respectively. The phase speed shown in curves 9, 10, and 11 correspond to lateral spacings 16 of 0.47, 0.345 and 0.22 inches, respectively, for a duct width 17 of 0.75 inches. The depth of the liner 3 was 0.75 inches. The length 22 of the liner 3 was 12 inches.

The liner had an effective thickness $L_e$ of 0.74 inches even though its actual thickness 18 (L) was 1.0 inch because of the void volume ratio of the liner. The honeycomb liner 3 was made of cylinders of about 0.25 inch diameter secured to each other with their interstitial voids filled with a binder and with their outer ends sealed by a wall 19 which is a continuation of wall 2 of duct 1.

Transmission Loss Measurements

Transmission loss measurements were made on the same duct as was used to obtain the phase speed, namely, a rectangular ¾ in. × ¾ in. tube lined on one side with 12-inch-long and 1-inch thick honeycomb liner. The parallel duct filter was then obtained simply by inserting a rigid partition as indicated in FIG. 1.

As a reference, it is interesting to determine first the transmission loss of the duct without a partition as shown in curve 30 of FIGS. 3(a), 3(b), and 3(c). In these transmission loss measurements, an incident pulsed harmonic wave train was observed by means of two microphones mounted in the wall of the hard-walled duct 1 on the input 20 and output 21 sides of the parallel duct filter 4. The input microphone is placed sufficiently far from the entrance to the filter so that the incident and reflected waves can be separated.

The incident ($p_i$) and transmitted ($p_t$) pulses are measured for the reference duct. When carrier frequency of the pulse is 753 Hz and (the pulse length is 5 cycles), the transmission loss (20 log $|p_i/p_t|$) is only about 3 dB.

FIG. 3(a) shows the corresponding data at point 31 for the parallel duct filter when the partition 5 spacing 16 is 0.22 in. from the lined wall 2 thereby dividing the duct into two branches in parallel, one lined 6 and one unlined 7. The transmission loss of the filter now exceeds 20 dB at 753 Hz. Much of the acoustic energy is reflected back toward the source. Using the measured value of the phase speed at 753 Hz in the lined duct portion, as given in FIG. 2, it is found from Eq. 3 that at 753 Hz $\Delta\phi_2 \approx 4\pi$, a condition for strong reflection in an ideal non-dissipative parallel duct filter.

Similar transmission loss measurements were carried out at many frequencies in the range from 300 Hz to 2000 Hz for the three different values of the separation of the lined duct wall and the partition. The frequency dependence of the transmission loss thus obtained is shown by plates 9, 10, and 11 in FIGS. 3(a), 3(b) and 3(c) for separation 16 of 0.22, 0.345 and 0.47 inches, respectively; where for comparison is shown on curve 30 the transmission loss for the lined duct with the partition removed (single duct). For each of the parallel duct configurations of FIGS. 3(a), 3(b) and 3(c) the transmission loss is considerably higher than for the single duct, and the maximum values of the transmission loss occur near frequencies corresponding to $\Delta\phi_2$ equal to even multiples of $\pi$.

In order to achieve destructive interference in a parallel duct filter with as short a filter as possible, it is desirable that the difference in phase speed between the two duct branches be as large as possible. The difference in attenuation, on the other hand, should be as small as possible in order to make strong destructive interference possible. If there is a difference in attenuation, it is possible to compensate for this difference to some extent by a proper choice of the ratio between the areas of the two duct branches.

Although the invention has been described and test results presented for a particular form of liner, it should be understood that other forms of liner will also function to produce the desired phase shift in the lined channel with respect to the unlined channel. The largest phase shift for a given volume of liner is obtained when the liner is a point-reacting liner, i.e., a liner that does not allow sound to propagate through the liner in a direction parallel to the length of the duct. The phase speed given in equation 1 assumes that the liner is a point-reacting one. As is known to those skilled in the art, a liner having partitions 24 spaced by less than a quarter wavelength gives a good approximation to a point-reacting liner. Thus, instead of a honeycomb, the liner 3 could have been made of transversely extending sheets spaced by the appropriate distance from each other along the duct.

The point-reacting liner could also be filled with a dissipative material such as urethane foam or fiberglass. The primary effect of the dissipative material will be to reduce the sharpness of the attenuation peaks and to produce higher attenuation at other frequencies than would be obtained without the filling.

The physical dimensions used for the testing of the filter of FIG. 1 were chosen for convenience. It should be understood that the dimensions scale inversely with frequency if peak attenuation is desired at another frequency.

Another embodiment 50 of the invention is shown in top cross-sectional view in FIG. 5. This embodiment differs from that of FIG. 1 in providing for the divider 5 to extend longitudinally along the duct beyond the liner 3. This extension 51 (L' in the analysis) does not produce any relative phase shift but is effective in producing the phae shift required for a strong reflection at the muffler entrance 20. If the extension 51 is omitted as in FIG. 1, a strong reflection at the muffler entrance 20 may still be obtained solely from the lined channel 6 and channel 7 when they provide the necessary phase shift. The extension 51 is a convenient means for tuning the muffler to reject a desired frequency since its length may be more readily changed than the length of the liner. The muffler analysis which follows includes the effect of gas flow 52 direction relative to the direction 53 of sound energy from a source (not shown). The lined duct 6 is considered to be composed of two sections A2 and B2 where A2 is coextensive with the liner 3 and has a different phase velocity than section B2. For reasons of symmetry in the analysis, duct 7 has two sections A1 and B1. The length of the liner is designated as S.

Sound and Flow in Same Direction as shown in FIG. 5 (Exhaust Muffler)

For destructive interference at muffler exit the sound waves traveling through duct 7 must be 180° out of phase with the sound wave traveling through duct 6. This condition is satisfied when $$(2n + 1)\pi = (k_{A1}^+ S + k_{B1}^+ L') - (k_{A2}^+ S + k_{B2}^+ L') \quad (4)$$

$$n = 0, 1, 2, \ldots N$$

In this case $k^+_{B1}=k^+_{B2}$ because the duct sections B1 and B2 are unlined. Thus eq. (4) becomes $$(2n+1)\pi(k^+_{A1}-k^+_{A2})S \quad (5)$$

where $$k^+ = 2\pi f/c^+ \quad (6)$$

f = frequency of incident sound wave, $c^+$ = phase speed of the fundamental sound mode, which is the lowest order sound mode having no nodal planes parallel to the duct axis, in the duct for sound traveling in the direction of the mean flow.

Strong reflections will occur at the entrance to the parallel duct muffler at frequencies determined by the following equations:

$$2n\pi = (k^+_{A1}S + k^+_{B1}L') + (k^-_{A2}S + k^-_{B2}L') \quad (7a)$$

$$2n\pi = (k^+_{A2}S + k^+_{B2}L') + (k^-_{A1}S + k^-_{B1}L') \quad (7b)$$

where $$k^- = \frac{2\pi f}{c^-}$$

$c^-$ = phase speed of the fundamental sound mode in the duct for sound traveling opposite to the direction of mean flow For M=0, Eqs. (7a) and (7b) are identical.

Sound and Flow in Opposite Directions (Intake Muffler)

For destructive interference to occur at the muffler exit (i.e. the end of the muffler away from the incident sound wave) the following equation must be satisfied.

$$(2n + 1)\pi = (k^-_{A1}S + k^-_{B1}L') - (k^-_{A2}S + k^-_{B2}L') \quad (8)$$

$$n = 0, 1, 2, \ldots N$$

In this case, $k^-_{B1}=k^-_{B2}$ because the duct sections are unlined. Thus eq. (8) becomes $$(2n+1)\pi=(k^-_{A1}-k^-_{A2})S \quad (9)$$

Strong reflections will occur at the entrance to the parallel duct muffler at frequencies determined by the following equations:

$$2n\pi=(k^-_{A1}S+k^-_{B1}L')+(k^+_{A2}S+k^+_{B2}L') \quad (10a)$$

$$2n\pi=(k^-_{A2}S+k^-_{B2}L')+(k^+_{A1}S+k^+_{B1}L') \quad (10b)$$

for M=0, eqs. (10a) and (10b) are identical. Also note that eqs. (10a) and (10b) are equal to eqs. (7b) and (7a), respectively. This shows that the frequencies at which strong reflections occur at the entrance to the parallel duct muffler are independent of the direction of the mean flow in the duct.

The equation for phase speed of the fundamental mode of low frequency sound waves a lined duct with flow is:

Phase speed in the direction of flow $$\frac{c^+}{c_o} = (1 + M)\frac{1 - M}{\sqrt{1 + 2\xi + \xi^2 M^2} - M(1 + \xi)} \quad (11)$$

The equation for phase speed opposite to the direction of flow is:

$$\frac{c^-}{c_o} = (1 + M)\frac{1 - M}{\sqrt{1 + 2\xi + \xi^2 M^2} + M(1 + \xi)} \quad (12)$$

where $M = V/c$
M = Mach number of flow in duct
V = Velocity of flow in duct
c = Local sound speed of flowing gas in duct and $\epsilon$ is a geometric parameter defined as follows:

$$\xi = \frac{V_{Le}}{V_a}$$

Where $V_{Le}$ = effective volume of liner (i.e. void volume of liner) = $\gamma V_L$, $V_L$ = volume of liner, $V_a$ = volume of airspace in duct between liner and divider.

For the rectangular duct geometry of FIGS. 1 or 5

$$\xi = \frac{L_{eff}}{2b}$$

b = divider separation from liner
$L_{eff}$ = effective thickness of liner = L where $\gamma$ = void volume ratio $$= \frac{\text{volume of space void in liner}}{\text{total volume of liner}}$$

For an annular duct configuration of the invention shown in longitudinal cross section in FIG. 6(a) and transverse cross section in FIG. 6(b)

$$\xi = \frac{1}{1 - \left(\frac{r_h}{r_t}\right)^2} \cdot \frac{L_{eff}}{r_t}\left(1 + \frac{L_{eff}}{2r_t}\right)$$

where $r_h$ is the radius of the rigid inner duct and $r_t$ is the radius of the rigid outer duct as shown in FIG. 6(a). The divider 5' of FIG. 6 is hollow to allow the acoustic energy to travel through it as well as between it and the liner 3. The same design considerations apply as for the rectangular liner for determining the frequency of maximum transmission loss.

For low speed flows $M \approx 0$ and equation 11 reduces to $$\frac{c^+}{c_o} = \frac{1}{\sqrt{1 + 2\xi}}$$

and equation 12 reduces to $$\frac{c^-}{c_o} = \frac{1}{\sqrt{1 + 2\xi}}$$

thus $c^+ = c^- = c$ for $M = 0$.

Although the invention has been described as a filter which is most effective in attenuating sound at its design frequency, it will be apparent to those skilled in the art that serially cascading such filters each designed to provide maximum attenuation at a different frequency will be useful where the noise source is providing energy concentrated at these design frequencies.

Also apparent to those skilled in the art will be that the single duct of the preferred embodiments of the invention having lined and unlined channels may be replaced by individual ducts, one having a lined region and the other an unlined region.

It will be further apparent from the immediately preceding analysis that the frequency of maximum transmission loss can be determined by the combined effect of the transverse location of the divider in the duct relative to the liner, the depth and length of the liner, and the length by which the divider exceeds the length of the liner.

While the particular embodiments of the invention specifically discussed above seems preferable at the present time, modification thereto may occur to those skilled in the art without departing from the spirit and scope of the invention. Examples of such variants include filters having unequal depths of liners on each side of a duct divider on the duct centerline; equal depths of liners on each side of an off-center divider; and a duct where the liner is located on one side of the divider. Hence, the invention is not to be construed as limited to the particular embodiment shown and described herein, except as defined by the appended claims.

What is claimed is:

1. An acoustical filter for attenuating acoustic energy in a duct comprising, in combination, a duct having at least one rigid and continuous splitter plate extending longitudinally within said duct to divide the acoustic energy in said duct into at least two branched ducts of equal length; said splitter plate preventing substantially any acoustic energy in each branched duct from coupling to the other branched duct through said plate by reflection of acoustic energy incident upon the plate back into the branched duct from whence the incident acoustic energy originated; the branched ducts having their input ends and their output ends acoustically coupled to each other, respectively; at least one of said branched ducts containing a means to alter the phase speed of the sound wave therein to define a flow path through said one branched duct having an acoustical length different from the acoustical length of the flow path through the other of said branched ducts to produce destructive wave interference at the output ends of said branched ducts and/or constructive wave interference at the input ends of said branched ducts thereby resulting in strong reflection of acoustic energy at the input ends of said branched ducts by which effects a reduced level of acoustic energy in said duct adjoing the outputs of said branched ducts is obtained.

2. The apparatus of claim 1 wherein each of said branched ducts have walls which together with the splitter plate confines acoustical energy in each branched duct and wherein said means to alter the phase speed in a branched duct comprises
   an acoustical liner comprising at least one wall of a branched duct.

3. The apparatus of claim 2 wherein said acoustical liner is a point reacting liner.

4. The apparatus of claim 3 wherein said point reacting liner comprises axially-spaced partitions with spacing of less than one-fourth the wavelength of the frequency to be attenuated by the acoustic filter,
   said partitions being transverse to the length of the lined branched duct of which it comprises the liner and terminating on the walls of said branched duct to form acoustic cavities having openings spaced from said splitter plate to provide a channel in said lined duct for acoustic energy to propagate with phase delay.

5. The apparatus of claim 4 wherein said space between the partitions is filled with an acoustical dissipative material.

6. The apparatus of claim 3 wherein said point reacting liner comprises a honeycomb, the axes of the honeycomb being transverse to the length of its channel, the walls of the honeycomb being spaced from each other by less than one-fourth the wavelength of the frequency to be attenuated by the acoustic filter, one end of the honeycomb terminating on a wall of the branched duct in which it forms the liner and the other end of the honeycomb forming a plane parallel to and spaced from said splitter plate to provide a channel in said lined duct for acoustic energy to propagate with phase delay.

7. The apparatus of claim 6 wherein said honeycomb is filled with an acoustical dissipative material.

8. The apparatus of claim 2, having two branched ducts, said splitter plate being longitudinally extended beyond the acoustical liner of a branched duct to tune said filter to the frequency to be attenuated.

* * * * *